(12) United States Patent
Haertel et al.

(10) Patent No.: US 7,481,060 B2
(45) Date of Patent: Jan. 27, 2009

(54) METHOD FOR OPERATING A POWER PLANT

(75) Inventors: Carlos Jimenez Haertel, Munich (DE); Sasha Savic, Wettingen (CH); Rolf Dittmann, Nussbaumen (CH)

(73) Assignee: Alstom Technology Ltd, Baden (CH)

( * ) Notice: Subject to any disclaimer, the term of this patent is extended or adjusted under 35 U.S.C. 154(b) by 250 days.

(21) Appl. No.: 11/411,850

(22) Filed: Apr. 27, 2006

(65) Prior Publication Data

US 2006/0248897 A1    Nov. 9, 2006

Related U.S. Application Data

(63) Continuation of application No. PCT/EP2004/052681, filed on Oct. 28, 2004.

(30) Foreign Application Priority Data

Oct. 30, 2003    (CH)    ............................ 1856/03

(51) Int. Cl.
*F02C 3/30*    (2006.01)
(52) U.S. Cl. ........................................ 60/775; 60/39.3
(58) Field of Classification Search .................. 60/39.3, 60/39.53, 775
See application file for complete search history.

(56) References Cited

U.S. PATENT DOCUMENTS

| | | | |
|---|---|---|---|
| 5,353,585 A | 10/1994 | Munk | |
| 5,463,873 A | 11/1995 | Early et al. | |
| 6,216,443 B1 | 4/2001 | Utamura | |
| 6,250,064 B1 * | 6/2001 | Tomlinson et al. | 60/775 |
| 6,260,350 B1 * | 7/2001 | Horii et al. | 60/39.3 |
| 6,530,210 B2 * | 3/2003 | Horii et al. | 60/39.53 |
| 6,805,483 B2 * | 10/2004 | Tomlinson et al. | 374/144 |
| 7,104,071 B2 * | 9/2006 | Braun et al. | 60/775 |

FOREIGN PATENT DOCUMENTS

| | | |
|---|---|---|
| DE | 25 49 790 A1 | 5/1977 |
| EP | 0 898 645 B1 | 3/1999 |
| EP | 1 203 866 A2 | 5/2002 |
| WO | 99/67519 A1 | 12/1999 |

OTHER PUBLICATIONS

Form PCT/ISA/210 (International Search Report) dated Feb. 9, 2004 and Mar. 3, 2005.
Form PCT/ISA/237 (International Report by the Searching Authority) dated Aug. 30, 2005.
Form PCT/IPEA/409 (International Preliminary Examination Report) dated Dec. 21, 2005.

* cited by examiner

*Primary Examiner*—William H. Rodríguez
(74) *Attorney, Agent, or Firm*—Buchanan Ingersoll & Rooney PC (57) ABSTRACT

A power plant comprises an air-breathing combustion engine having an air inlet and an inflow duct arranged upstream of the air inlet, as well as an atomization device arranged in the inflow duct. In a method for operating this power plant, a liquid is injected into the inflow duct in the atomization device. During the injection, at least the temperature of the atomization liquid which is to be injected upstream of the atomization device or the temperature in the inflow duct downstream of the atomization device is measured. One of these measured temperatures is used as control variable for control of the temperature of the atomization liquid.

31 Claims, 8 Drawing Sheets

METHOD FOR OPERATING A POWER PLANT

RELATED APPLICATIONS

This application claims priorities under 35 U.S.C. § 119 to Swiss Application No. 1856/03, filed Oct 30, 2003, and as a Continuation Application Under 35 U.S.C. § 120 to PCT Application No. PCT/EP 2004/052681 filed as an International Application on Oct 28, 2004 designating the U.S., the entire contents of which are hereby incorporated by reference in their entireties.

FIELD OF THE INVENTION

The present invention relates to a method for operating a power plant in accordance with the preamble of claim 1, and to a power plant which is particularly suitable for carrying out the method.

BACKGROUND OF THE INVENTION

In the prior art, for example from DE 25 49 790, it is well known to inject a liquid into the intake section of combustion engines, such as for example gas turbosets. The evaporation of the liquid cools the intake air and increases power. The effect can be boosted further if the injected liquid mass flow is selected to be so great that the intake air is no longer able to take it up, i.e. becomes supersaturated with liquid, in such a manner that at least some of the liquid only evaporates during the compression. Therefore, if liquid drops penetrate into the substantially adiabatic turbo-compressor of a gas turboset, the evaporation in the compressor results in intensive internal cooling, and the power consumption of the compressor is reduced, which can significantly increase the net power output of the gas turboset. This method has become known, inter alia, as overfogging or wet compression. In addition, purely evaporative cooling of the intake air by means of injected drops of liquid is known as fogging.

It can be established from what has been stated above that the evaporation of injected liquid can lead to a significant temperature drop upstream of the air inlet of an engine. The temperature drop is substantially dependent on the quantity of liquid evaporated specific to the air mass. A large number of factors are crucial in this respect; firstly, the evaporation is determined by the size of liquid drops injected and their vapor pressure. Furthermore, the residence time of the drops, i.e. the distance from the air inlet to the injection location, is a crucial factor. The above mentioned influencing variables are often eliminated by fixing the drop size or drop size range within tight limits and selecting the arrangement of the injection location in such a way that moisture-saturated air is present at the air inlet of the engine, i.e. the maximum possible cooling has been achieved. The mass flow of the engine is maximized in this way. Under these conditions, the cooling which can be achieved on account of the evaporation is limited substantially by the ambient conditions of the incoming air; the cooling can continue at most up to saturation of the air and is therefore dependent mainly on the entry temperature and the relative humidity of the incoming air: whereas humid, warm air undergoes scarcely any cooling through evaporation, dry and hot air is cooled to a very considerable extent.

On account of the acceleration of the flow, further cooling of the humid air flow and if appropriate the liquid drops enclosed therein take place in the air inlet of engines, for example in the compressor inlet of a gas turboset. This can lead to the harmful formation of ice. On account of the accelerating effect, under unfavorable ambient conditions ice can form even in engines which do not have any injection of liquid. In the case of power plants which are built at locations at which such ambient conditions frequently occur, therefore, what are known as anti-icing systems form part of the prior art. In this case, by way of example, warmed air from a downstream compressor stage of a gas turboset is bled off and admixed to the intake air. Other known systems warm the intake air by heat exchange.

Therefore, EP 898 645 proposes that heat and—to ensure supersaturation of the intake air—further moisture be fed to the intake air under conditions which can lead to the formation of ice. However, this requires the presence of corresponding means for supplying heat, for example an anti-icing system. However, the provision of anti-icing systems is cost-intensive, complex, and moreover a heat exchanger system in the inflow duct of an air-breathing engine takes up installation space and causes pressure losses.

U.S. Pat. No. 6,216,443 proposes that if atomizer nozzles assisted by auxiliary media are used, either steam be used as auxiliary atomization medium, or air used for atomization be suitably preheated. Furthermore, U.S. Pat. No. 6,216,443 proposes that the temperature of water to be atomized be set to 10 to 80° C., in order to influence the location at which evaporation takes place. However, the application of this teaching requires the use of atomizers which are assisted by auxiliary media, with the associated drawbacks which this is known to entail.

SUMMARY OF THE INVENTION

The invention seeks to remedy this problem. The invention as characterized in the claims is based on the object of providing a method of the type described in the introduction which is able to avoid the drawbacks of the prior art. In particular, the operating range for the injection of liquid in the inflow duct of an air-breathing engine is to be widened without having to carry out complex apparatus-related measures. For example, it is intended to avoid operation which is specially designed for wet compression with dry ambient air and/or a low intake air temperature having to be provided in power plants which do not fundamentally need an anti-icing system in view of the metrological boundary conditions.

This method is to be equally suitable for implementation using simple and energy-efficient pressure atomization, a term which is in the present context also deemed to encompass refinements such as pressure swirl atomization or flash atomization, and using atomization assisted by auxiliary media.

In the present context, the term pressure atomization is to be understood as meaning atomization methods in which the energy required for the atomization is not supplied primarily by auxiliary media, as is the case for example with air-assisted or steam-assisted atomizers as proposed by U.S. Pat. No. 6,216,443, but rather at least the majority of the energy required for the atomization is supplied in the liquid to be atomized itself. Examples which may be mentioned include, inter alia, pure pressure atomization, as well as the flash atomization which has been disclosed by WO 9967519 and in which superheated, pressurized liquid effects atomization through spontaneous boiling at the nozzle outlet, or pressure swirl atomization, in which a swirl is also imparted to the liquid at the outlet from an atomizer nozzle. It is also known to combine flash atomization and pressure swirl atomization, as has been disclosed in WO 9967519 under the name Swirl Flash Atomization.

However, it should be noted that the invention can advantageously also be used in combination with atomization assisted by auxiliary media, as is known from U.S. Pat. No. 6,216,443.

According to the invention, this object is achieved using the combination of features of claim 1.

Therefore, the core concept of the invention is that of controlling the temperature of the liquid that is to be atomized in a closed-loop control circuit.

According to one embodiment of the invention, the temperature in the inflow duct downstream of the atomization device is used as control variable for the control circuit. This is an eminently suitable way of extending the operating range of the water injection to ambient conditions in which there would otherwise be a likelihood of ice forming in the air inlet of the engine.

In a further embodiment of the invention, the temperature of the liquid to be atomized itself is used as control variable. This proves highly advantageous in particular in conjunction with flash atomizers. In the case of flash atomization, the vapor pressure of the liquid to be atomized, and therefore the temperature of this liquid, is a co-determining factor in the drop range which is produced. In this context, therefore, it is highly advantageous for the temperature of the liquid that is to be atomized to be adjusted to a desired value or to within a desired value range. Depending on the specific application and the required control quality, steady-state or non-steady-state controllers, in particular two-point controllers, are used to set the temperature between an upper temperature limit and a lower temperature limit. In the case of flash atomization, temperatures above the boiling point of the liquid at ambient pressure are set, i.e. generally 100° C. or well above. Typical state variables for the atomization liquid, in the case of water, would be a temperature range from 140° C. to 250° C. at a pressure of around 150 bar. Furthermore, when controlling the temperature of the atomization liquid, it is advantageous also to measure the temperature in the inflow duct downstream of the atomization device, and to use this temperature as a control variable for limit-value control, in such a way that the injection of liquid is deactivated for safety reasons if the temperature exceeds a permissible maximum value or drops below a permissible minimum value.

According to the first method variant, a temperature of the humid air or of the air/drop mixture in the inflow duct is measured. In this case, the measurement location is selected to be sufficiently far downstream of the atomization device, so that the evaporation of the drops and the associated cooling has as far as possible been concluded. A preferred position for a temperature-measuring location is substantially directly upstream of the air inlet of the machine.

According to a first embodiment of this method variant, the temperature measured in the inflow duct is set to a desired value or to within a desired value range. If the measured temperature drops below the desired value or a lower threshold value, the temperature of the atomization liquid is increased. Conversely, if the measured temperature exceeds the desired value or a lower threshold value, the temperature of the atomization liquid is reduced.

According to a second embodiment, the temperature control is operated as a limit value control. When a lower limit value for the temperature measured in the inflow duct, at which for example the formation of ice can no longer be ruled out, is reached, the temperature of the atomization liquid is increased.

In both embodiments, it is highly advantageous also to measure the temperature of the atomization liquid and for this temperature to be limited to an upper limit value which is, for example, a safety margin below the boiling point of the atomization liquid at ambient pressure. This prevents the liquid from boiling as it emerges from the atomization device. If the injection nozzles of the atomization device have not been specially designed for flash atomization, serious erosion and cavitation damage may otherwise result, and this damage is avoided in this way. Furthermore, it is advantageous to completely deactivate the injection of liquid if the upper limit value for the temperature of the atomization liquid and the lower limit value for the temperature in the inflow duct have been reached simultaneously.

According to the method described above, the temperature of the atomization liquid is used, inter alia, to raise the temperature in the inflow duct. An absolute increase in the air temperature requires a very high temperature difference between the atomization liquid and the air and a very high overspray proportion in the liquid injected; in the case of water, on account of the high evaporation enthalpy, a considerably greater mass flow has to remain unevaporated than evaporated. It can easily be estimated that, if the temperature of injected water is around 50° C. above that of the incoming air, much less than 10% of the total mass flow injected may evaporate in order to achieve an absolute temperature increase in the air at all. On the other hand, based on the above assumptions, and with 1% of unevaporated water based on the air quantity, the temperature of the mixture is increased by roughly 1.5° C., i.e. the temperature drop caused by the evaporation is reduced by around 1.5° C., with the result that the operating range for icing-free high-fogging operation is in fact considerably widened.

Of course, it is also possible, by cooling the atomization liquid, to lower the temperature in the inflow duct, within certain thermodynamic boundaries, to a greater extent than would be possible by means of the pure evaporation effect. Therefore, in the interest of efficiency and performance, it is possible to set the temperature in the inflow duct to a value which is as close as possible above the temperature at which ice is formed.

It is also advantageous to lower the temperature of the atomization liquid if the temperature in the inflow duct reaches an upper threshold value. In particular turbo-compressors often have a maximum permissible inflow temperature which must not be exceeded; besides this aspect, excessively high inflow temperatures, as mentioned above, have a significant adverse effect on the thermodynamic characteristic variables of a power plant.

When lowering the temperature of the atomization liquid, it should be ensured that this liquid is not cooled to such an extent that ice starts to form in the lines used for the atomization liquid. In this respect, the drop in the temperature of the atomization liquid should be limited to a minimum value. The minimum value can be reduced considerably by adding a suitable antifreeze additive. If the temperature of the atomization liquid nevertheless drops below this minimum value, and at the same time the temperature in the inflow duct is still above a limit value, corresponding measures need to be taken.

The temperature of the atomization liquid can be altered in various ways. According to one embodiment, at least some of the atomization liquid is passed through a heat supply device prior to injection into the inflow duct. According to one embodiment, the supply of heat in the heat supply device is controlled.

On the other hand, it often proves easier, and feasible with better control dynamics, for a second part-stream to be made to bypass the heat supply device in a bypass line, and for the part-streams to be combined again prior to the atomization, in which case at least one of the part-streams is controlled variably, in such a manner that the ratio of the preheated mass stream to the mass stream which is not preheated varies. In this case, if the temperature of the atomization liquid is measured, it is preferable for this to take place downstream of the location at which the part-streams are combined. In one embodiment, the part-stream passed through the heat supply device is evaporated and combined with the bypass stream in a mixing preheater. This enables the part-stream passed through the heat supply device to be kept at a low level. Furthermore, it is advantageous if the part-stream passed through the heat supply device is at a pressure which at least matches the atomization admission pressure even before it is introduced into the heat supply device.

Although it is fundamentally possible to use an external heat source to heat the first part-stream, it is advantageous to use waste heat from the machine itself to heat the first part-stream, for example by the heat supply device being designed as an exhaust-gas heat exchanger.

One embodiment of the method according to the invention comprises the step of passing the atomization liquid through a cooler prior to it being injected into the inflow duct, and controlling the cooling capacity of the cooler. This preferably also comprises measuring the temperature of the atomization liquid downstream of the cooler, and taking suitable countermeasures in the event of a threat of ice forming in the atomization liquid, in particular by reducing the cooling capacity or adding antifreeze additives.

Further advantageous variants of the method according to the invention and devices and power plants which can advantageously be used to carry out the method are described in the further claims and the exemplary embodiments.

BRIEF DESCRIPTION OF THE DRAWING

The invention is explained in more detail below on the basis of exemplary embodiments illustrated in the drawing, in which, in detail.

Elements which are not directly required to gain an understanding of the invention have been omitted. The exemplary embodiments are to be understood as being purely instructive and are not intended to be used to restrict the invention as characterized in the claims.

WAY OF CARRYING OUT THE INVENTION

Figure 1:
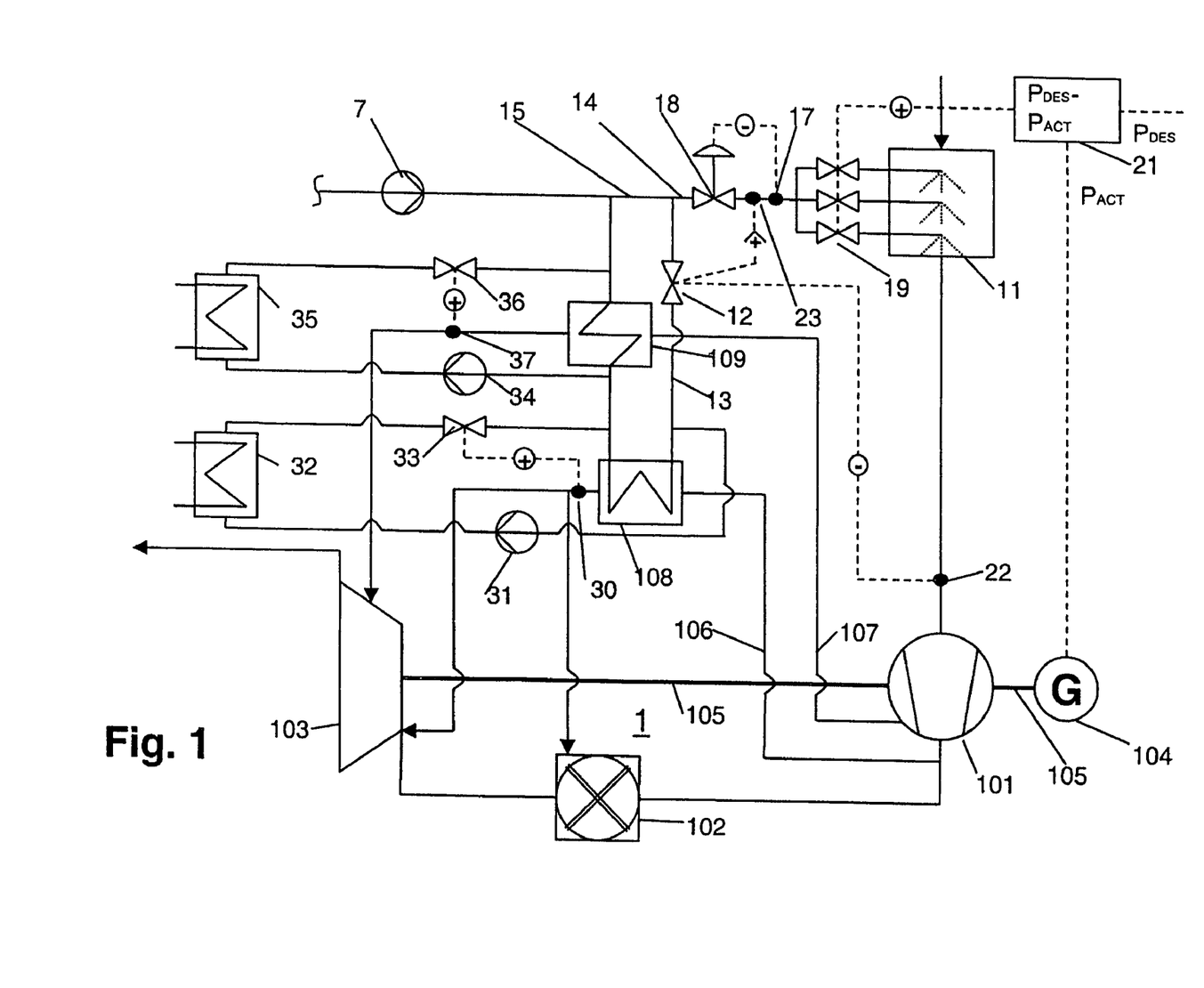
FIG. 1 shows a first embodiment of the invention.

FIG. 1 illustrates a gas turboset which, in a manner which is known per se, comprises a compressor 101, a combustion chamber 102, a turbine 103 and a generator 104. The turbine drives the compressor and the generator via a shaft 105. The gas turboset illustrated also has an injection and atomization device 11 for a liquid, in particular water, arranged upstream of the compressor inlet. Liquid which is injected there can increase the power and efficiency of the gas turboset in two ways: firstly, some of the liquid injected as a mist of droplets is evaporated while it is still in the intake duct, with the result that the compressor intake air is cooled, bringing about an increase in the density of the intake air and in the mass flow which is delivered. Furthermore, liquid drops which penetrate into the compressor effect intensive internal cooling in the compressor, which consequently takes up less power, with the result that more of the turbine power is available for driving the generator. Sufficiently fine atomization of the liquid in the atomization device 11 with pressure atomizer nozzles which are preferably to be used, the aim being to achieve drop sizes of less than 50 μm, requires a high atomization admission pressure, which is typically in the range of around 30 to 150 bar, in particular 100 to 150 bar. In particular if the drops are supposed to penetrate into the compressor, highly purified demineralized water is required, in order to avoid the formation of deposits on the compressor blades. A pump 7 delivers the pressurized demineralized liquid mass flow to the atomization device 11 via the inflow line 14.

Figure 2:
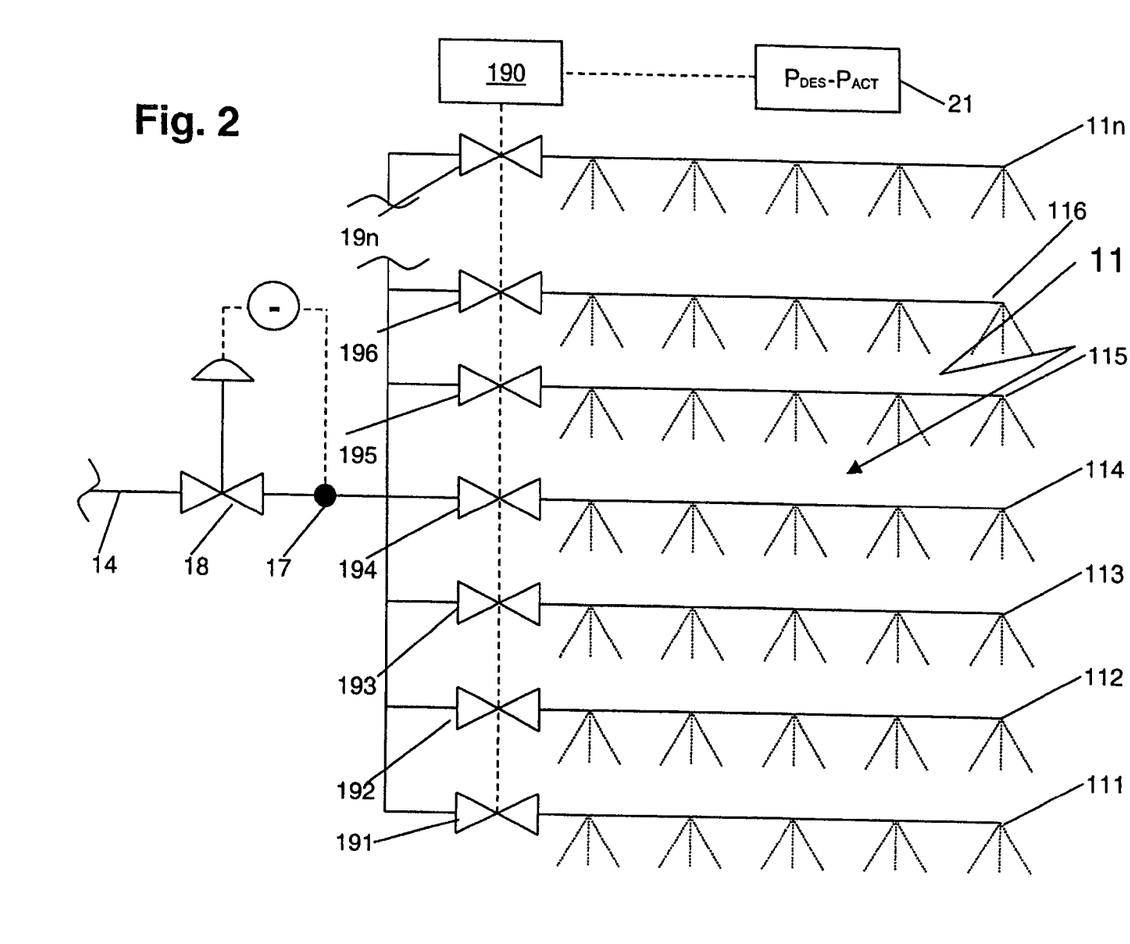
FIG. 2 shows a detail of the atomization device.

FIG. 2 will be used for a further explanation of the actuating elements 18 and 19 and of the pressure-measuring location 17. The injection device 11 comprises a plurality of nozzle tubes 111 to 11$n$. These are selectively connected up and disconnected by means of the shut-off members 191 to 19$n$. Each nozzle tube 111 to 11$n$ bears a number of atomizer nozzles, which are not illustrated individually but will be familiar to a person skilled in the art. In the case of atomizer nozzles, the fineness with which the liquid mist is generated is dependent to a crucial extent on the atomization admission pressure. Therefore, a pressure control valve 18 is arranged in the line 14. This valve opens and closes as a function of a pressure determined at the pressure measuring location 17, in order to keep this pressure constant. The liquid mass flow is therefore determined to a crucial extent by the free cross sections of flow, i.e. the number of nozzle tubes supplied with liquid. A functional block 21 records the actual power $P_{ACT}$ of the generator and a power desired value $P_{Des}$ and uses this information to form the desired/actual value deviation $P_{Des}-P_{ACT}$. The desired/actual value deviation is transmitted to a control unit 190. In the event of a positive deviation, at least one of the shut-off members 191, 192, . . . , 19$n$ is opened selectively. As a result, a nozzle tube is additionally supplied with liquid, and if the admission pressure remains constant the mass flow of liquid which is injected is increased.

Returning to FIG. 1, therefore, the actuating member 18 is provided for the purpose of keeping the atomization admission pressure constant or at least within a desired value range. The actuating member 19, i.e. in the present case a valve assembly, controls the mass flow of the liquid that is to be injected. In the form which is currently being explained, the control of the mass flow and of the liquid admission pressure are most advantageously decoupled from one another. A temperature of the humid air or of the air/drop mixture in the inflow duct upstream of the compressor inlet is measured at a temperature-measuring location 22 located upstream of the compressor 101 and downstream of the atomization device 11. Within certain thermodynamic limits, it is possible to effect open-loop or closed-loop control of the temperature at the measuring location 22 by varying the temperature of the atomization liquid. Of course, it would also be possible for the entire mass flow of liquid that is to be atomized to be passed through a heat supply device and for the heat supply to be controlled in this heat supply device. However, this is not regarded as advantageous, since controlling the heat supply in this way inter alia entails a poor dynamic performance. Furthermore, within the context of the invention it would of course also be possible for the heat exchanger for the atomization liquid to be coupled to an external heat generator. This option is likewise not considered advantageous, because for example it requires additional fuel, and an engine usually has available sufficient waste heat at a suitable temperature level. It is therefore preferable for a heat supply device for a part-stream of the atomization liquid to be designed as a heat exchanger which is arranged, for example, in the exhaust-gas flow from a heat engine, or is thermally connected to cooling units. For example, the heat exchanger can readily be arranged in the cooling circuit of a diesel engine or can take up heat from lubricating oil coolers, or, as explained below, may be connected to cooling air coolers of a gas turboset. Although further embodiments, in particular those which are deemed less advantageous, are not explicitly presented as exemplary embodiments, such embodiments will nonetheless readily become clear to a person skilled in the art in the light of the present description and are also included within the scope of the invention disclosed.

FIG. 1 explains the cooling system of the gas turboset 1 illustrated. The gas turboset illustrated has a two-stage cooling air system. A high-pressure cooling air path 106 branches off from the flow path of the compressed air downstream of the compressor 101 and carries air at combustion chamber pressure level. A low-pressure cooling air path 107 branches off within the compressor and carries cooling air at a lower pressure level. The high-pressure cooling air is used to cool the combustion chamber 102 and a first part of the turbine 103; the low-pressure cooling air flows into the turbine downstream of a first expansion section. Multi-stage cooling air systems of this type, although very complex, are used in gas turbosets with high pressure ratios, on account of the required cooling air throttling, which is subject to losses. This is very advantageously used for gas turbosets with sequential combustion, as are known from EP 620 362, where the first combustion chamber and the high-pressure turbine are cooled with the high-pressure cooling air, while the second combustion chamber and the low-pressure turbine are cooled with the low-pressure cooling air. To improve the efficiency of cooling, both cooling air paths comprise cooling-air coolers 108 and 109, in which heat is dissipated from the cooling air. In modern gas turbosets under full-load conditions, the temperature of the cooling air which flows to the high-temperature cooling-air cooler can easily be in the range from over 400° C. to well over 500° C., which illustrates the calorific potentials which could be exploited. A part-stream of the liquid delivered by the pump 7 is passed, in the direction of increase in temperature, first of all through the low-pressure cooling-air cooler 109 and then through the high-pressure cooling-air cooler 108, and takes up heat as it does so. The cooling-air coolers are arranged in the flow path of the liquid downstream of the pump 7; at this location, the liquid pressure is typically around 30 to well over 100 bar, in particular 100 to 150 bar. It is therefore possible to supply a large quantity of heat without the liquid boiling, which simplifies the construction of the heat exchanger units 108 and 109. The heated liquid flows via a line 13 with an actuating member 12 to a common feedline 14. In the process, it is mixed with unheated fluid routed via a bypass line 15. In the embodiment illustrated, suitable measures are to be taken to ensure that the liquid in the flow path 13 does not boil; nevertheless, it will be readily comprehensible that a mixing preheater may be arranged at the location where the flow path 13 and the bypass line 15 are combined, in such a manner that the heat exchanger 108 would be designed as an evaporator, and in the line 13 heating steam would be passed to the liquid routed via the bypass line. A temperature-measuring location 22 is arranged in the inflow duct of the gas turboset, as short a distance as possible upstream of the air inlet of the compressor 101. The temperature measured at this temperature-measuring location 22 serves as a control variable for a control circuit. The control variable for the control circuit is the position of the actuating member 12. If the measured temperature rises, the actuating member 12 is closed and the proportion of heated liquid is reduced, and if the measured temperature drops, the actuating member is opened and the proportion of heated liquid is increased. This results in changes in the temperature of the atomization liquid which is injected into the inflow duct in the atomization device 11, and in this way the temperature in the inflow duct is influenced. Furthermore, a temperature-measuring location 23 for measuring the temperature of the atomization liquid is arranged downstream of the location where the line 13 for the heated liquid and the bypass line 15 are combined. If this temperature of the atomization liquid exceeds a defined upper limit value, the actuating member 12 is closed. This prevents the atomization liquid from reaching a temperature at which, during expansion at the nozzle exit, boiling occurs, which would otherwise lead to serious damage to the injection nozzles if the latter are not specifically intended for flash atomization. Accordingly, the liquid mass flow which is passed through the cooling-air coolers 108 and 109 via the line 13 varies very considerably, in such a manner that the required dissipation of heat in the cooling-air coolers cannot always be ensured. Therefore, in combination with the cooling-air coolers 108, 109 there are controllable coolant recirculation loops which branch off in the liquid flow path downstream of each cooling-air cooler. Circulation pumps 31 and 34 deliver liquid to coolers 32 and 35. The liquid which has been cooled there is fed back into the liquid flow path upstream of the coolers 108 and 109. Actuating members 33 and 36, the opening of which is controlled as a function of temperatures of the cooled cooling air measured at measuring locations 30 and 37, are arranged in the recirculation loops. If the temperature of the cooling air downstream of a cooler rises, the actuating member of the respective recirculation loop is opened, after which the recirculated mass flow increases and the temperature drops. It is in this way possible to set the cooling-air temperature to a desired value irrespective of the atomization liquid mass flow in the line 13; heat which the atomization liquid does not dissipate is dissipated in the coolers 32 and 35. The heat which is produced in the coolers 32 and 35 can be dissipated in a cooling tower or utilized in some other way which is not relevant to the invention, for example for fuel preheating so as to boost efficiency.

The cooling air system of the gas turboset is not specified in more detail in the following illustrations.

Figure 3:
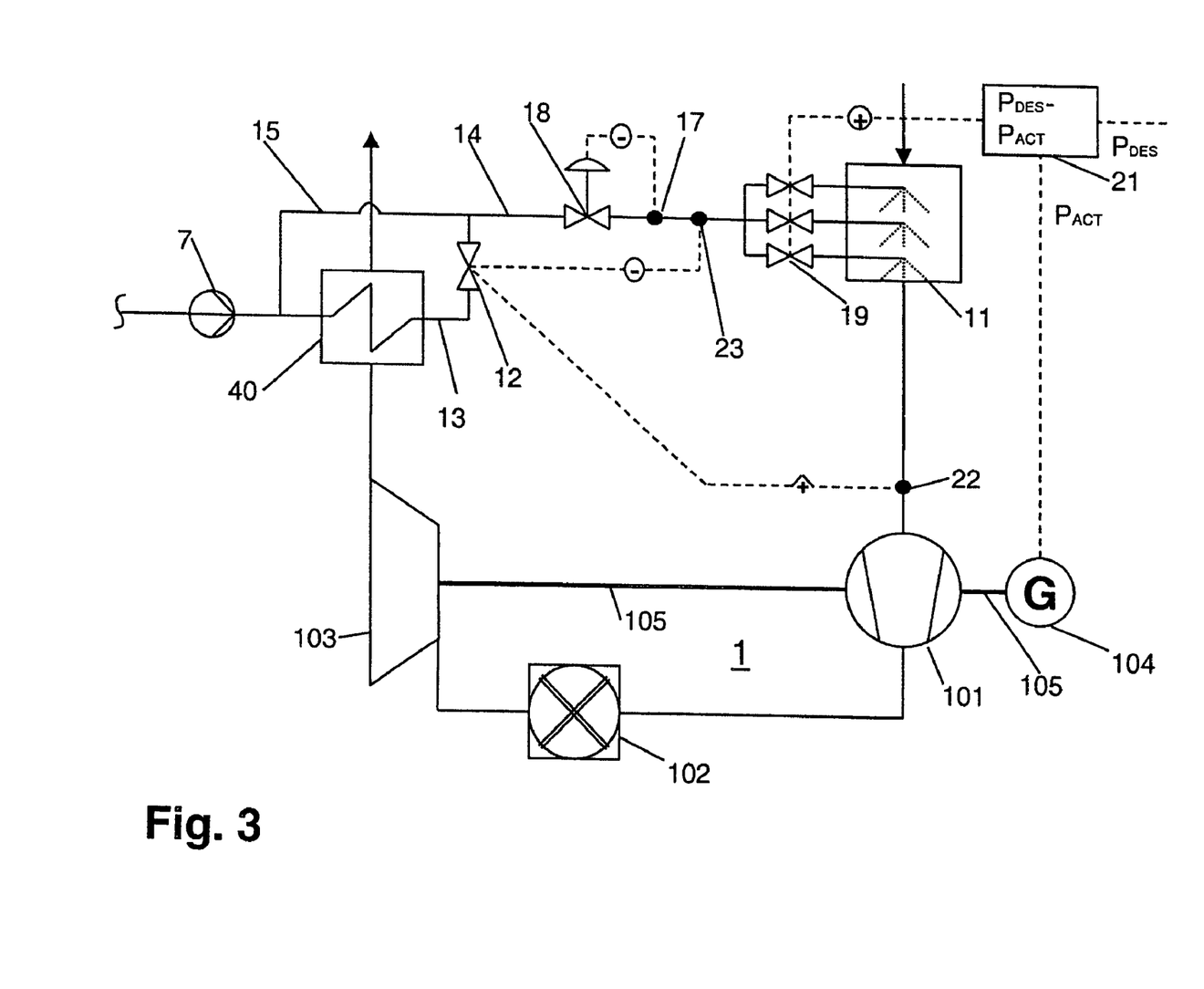
FIGS. 3 and 4 show embodiments of the invention using, by way of example, flash atomizers.

A second power plant which is operated in accordance with the invention is illustrated in FIG. 3. The gas turboset 1 is described in conjunction with FIG. 1.

In the present case, the atomization device 11 is operated with flash atomization, i.e. the atomization liquid emerges from the atomizer nozzles at a temperature above its boiling point at ambient temperature. The temperature of water is in this case, for example, around 120° C. to 300° C., in particular 150° C. to 200° C. On account of the expansion at the nozzle outlet, spontaneous boiling of the liquid occurs, and the primary drops generated at the nozzle exit break up into small fragments. Flash atomization has been described in WO 9967519. Accordingly, the atomization admission pressure and the temperature of the atomization liquid are crucial for the drop sizes produced. The liquid to be injected is passed by the pump 7 through an exhaust-gas heat exchanger 40 and is warmed by heat exchange with the exhaust gas from the gas turboset. The liquid flows out of the exhaust-gas heat exchanger 40, through the line 13 with the actuating member 12 and the pressure control unit 17, 18, to the atomization device described in connection with FIG. 2. Depending on the mass flow of liquid flowing through the exhaust-gas heat exchanger 40 and the loading state of the gas turboset, it is necessary to reckon with considerable fluctuations in the temperature of the liquid emerging from the exhaust-gas heat exchanger 40. Therefore, the heat exchanger 40 is bypassed by a bypass line 15. Upstream of the pressure control valve 18, the line 13 and the bypass line 15 open out into a common feedline. The temperature of the mixture of heated and unheated fluid is measured by means of a temperature-measuring location 23. The actuating member 12 is controlled using this measured value as control variable, and in this way the mass flow proportions formed by the preheated fluid and the fluid which has not been preheated are altered. If the temperature of the atomization liquid measured at the measuring location 23 rises, the actuating member 12 is closed. The proportion of heated mass flow drops, and consequently so does the temperature of the atomization liquid. Conversely, the actuating member is opened if the measured temperature drops. It is in this way easy to set the temperature to a desired value; this of course also involves a desired/actual value comparison of the temperature, which is not illustrated but with which a person skilled in the art will be entirely familiar. It is likewise also possible to implement two-point control in order to set the temperature to within a desired value range. An increase in the temperature of the atomization liquid of course also leads to an increase in the temperature in the inflow duct of the compressor 101. This temperature is restricted to an upper permissible maximum value. Therefore, the temperature is measured at the measuring location 22 and used as control variable for a limit control. If the permissible maximum temperature value is reached or exceeded, the actuating member 12 is closed as part of a safety circuit, and if appropriate further measures are initiated.

Figure 4:
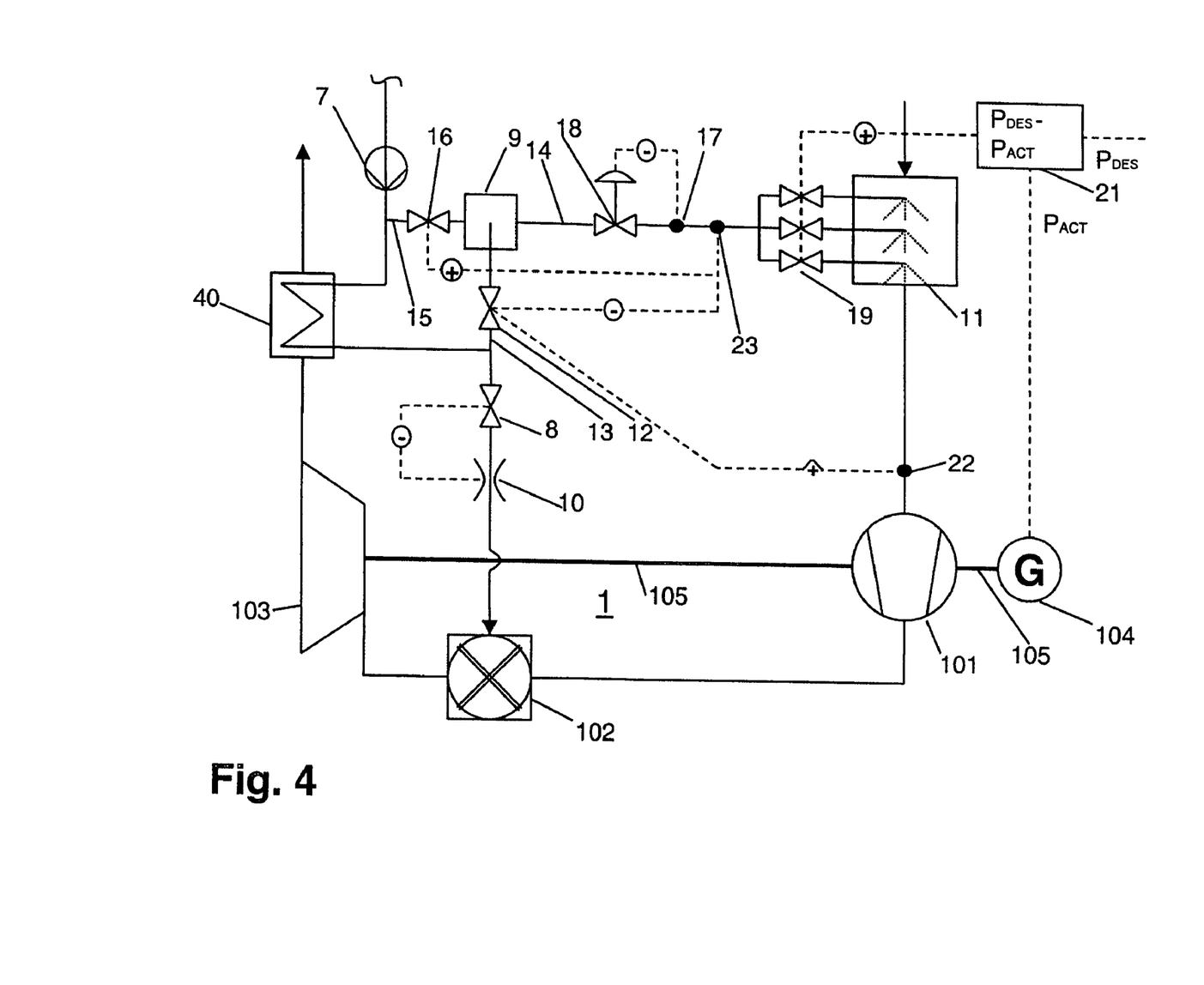

The gas turboset illustrated in FIG. 4 has an injection of steam into the combustion chamber 102. An injection of steam via burner lances is well known, for example, in order to minimize nitrogen oxides. Water is delivered from the pump 7 to a heat recovery steam generator 40, where it is evaporated. Some of the steam which is generated is injected into the combustion chamber 102 via a mass flow control section, comprising an actuating member 8 and a mass flow measuring location 10, in a manner which is known per se. An injection downstream of the combustion chamber 102 and upstream of the turbine 103 is also known from the prior art. The criteria according to which the mass flow desired value is defined, for example as a function of the generator power $P_{ACT}$ and a fuel quantity, have been amply described elsewhere; more detailed explanations would go far beyond the boundaries of what is required here. A bypass line 15, which passes pressurized, unheated water to a mixing preheater 9, branches off downstream of the pump 7 and upstream of the steam generator 40. A line 13, which passes a part-stream of the steam that is generated to the mixing preheater 9 as heating medium, branches off downstream of the steam generator 40. Heated liquid flows via the feedline 14 to the atomization device 11 in the manner described above. The temperature of the atomization liquid is determined at the measuring location 23 and set to a desired value. For this purpose, a bypass actuating member 16 is arranged in the bypass line 15, and a heating steam actuating valve 12 is arranged in the steam line 13. If the temperature of the atomization liquid exceeds the desired value, the bypass actuating member 16 is opened and the heating steam actuating valve 12 is closed. Conversely, if the temperature actual value drops below the desired value, the bypass actuating member 16 is closed and the heating steam actuating valve 12 is opened. Limit control of the temperature in the inflow duct, which is determined using the measuring location 22, is implemented in the manner described in connection with FIG. 3.

Figure 5:
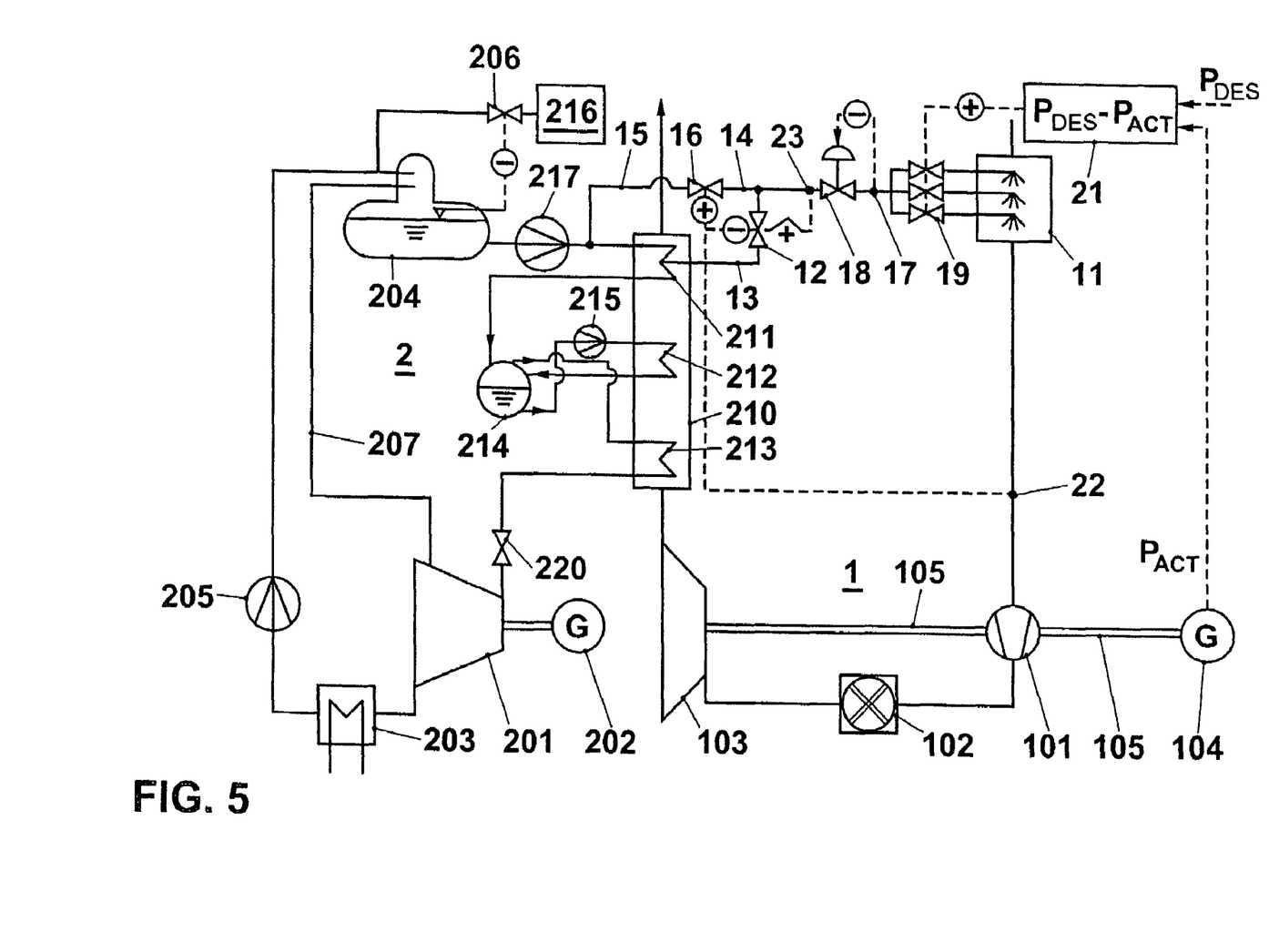
FIGS. 5 to 8 show further alternative embodiments of the invention in combined-cycle plants.

The power plant illustrated in FIG. 5 is a combined-cycle plant and in addition to the gas turboset 1 also comprises a water/steam cycle 2. The water/steam cycle 2, which is known per se, comprises a heat recovery steam generator 210, which for its part includes a preheater 211, an evaporator 212, a superheater 213 and a steam drum 214 as well as a recirculation pump 215 for the evaporator. The exhaust gases from the gas turboset flow through the heat recovery steam generator, in a manner which is well known per se, and this heat recovery steam generator uses the residual heat of these exhaust gases to generate steam. A person skilled in the art will be entirely familiar with the way in which the water/steam cycle functions: the steam which is generated is fed via the live steam control valve 220 to a steam turbine 201, where it is expanded so as to drive a generator 202. The live steam control valve is actuated, in a manner known per se, by a steam turbine power controller (not shown). The expanded steam is passed into a condenser 203 where it is condensed. The condensate, which is at a pressure of around 30-50 mbar depending on the condenser temperature, is passed by a condensate pump 205 into the feedwater tank 204 which, as explained below, in the present case simultaneously serves as a degassing means. The boiler feed pump 217 delivers the condensate, which in the feedwater tank is typically at a pressure in the range from 2 to 5 bar, up to the live steam pressure and into the steam generator which, as will likewise be familiar to a person skilled in the art, has flow passing through it in the order preheater, evaporator, superheater, thereby closing the circuit. A person skilled in the art will be familiar with numerous modifications to the cycle illustrated, but these details are not of primary importance to the invention. In the present case, a partially expanded steam mass flow 207 is removed from the steam turbine and fed as degassing medium to the feedwater tank 204. This degassing medium can also be used to preheat the feedwater to a temperature which is able to prevent the gas turboset flue gases from dropping below the dew point in the region of the preheater 211. The feedwater tank also has a level control, which is able to compensate for water losses caused by inevitable leaks or during degassing of the condensate. The level measurement controls an inlet valve 206, which in turn controls the supply of the supply of make-up water from a water treatment installation 216. The level control can be implemented continuously or as part of a two-point control. In the flow path of the steam generator, in the present case in the preheater 211, a branch line 13 branches off from the water/steam cycle, and heated liquid is passed via this branch line to the atomization device 11. A bypass line 15 branches off from the water/steam cycle downstream of the feed pump 217 and upstream of the steam generator 210. Both branch lines 13 and 15 open out in a common feedline 14 leading to the atomization device 11. Therefore, the mixing of preheated medium and medium which has not been preheated takes place upstream of the atomization device, which makes this embodiment advantageous in particular in the context of atomizers which are not assisted by auxiliary media. Actuating members 12 and 16 allow adjustment of the relative mass flow proportions of the liquid which has not been preheated in the bypass line 15 and of the preheated liquid in the line 13, and therefore allow the temperature of the liquid in the feedline 14 to be adjusted. A temperature-measuring location 22, which determines the temperature of the humid air or of the air/drop mixture, is arranged in the inflow duct, sufficiently far downstream of the atomization device and close to the compressor inlet. On account of the evaporation action and the acceleration of the flow toward the compressor inlet, the temperature at this location can be well below ambient temperature. The actuating members 12 and 16 are actuated as a function of these measured values. However, this only controls the mass flow ratios of preheated fluid and fluid which has not been preheated; the entire mass flow continues to be controlled by the shut-off members 19 and the controller 21 as a function of the net power of the gas turboset, in the manner described above. In a first operating state, the actuating member 12 is fully closed. The entire mass flow of the atomization device 11 is passed through the first bypass line 15 without heating. This results in maximum cooling of the intake air of the gas turboset, since the injected liquid is at the lowest possible temperature. If the temperature measured at the measuring location 22 then drops below a defined value, for example 7° C. or 5° C., the actuating member 12 is opened a certain amount, and actuating member 16 is closed a certain amount. As a result, part of the water to be injected flows through the preheater 211 of the steam generator 210, where it is heated. This increases the temperature of the water to be injected, and consequently the temperature at the compressor entry also rises. A further temperature-measuring location 23 is arranged upstream of the atomization device and downstream of the point at which the preheated liquid and the liquid which has not been preheated are combined. If the atomization temperature measured there drops below a defined safety margin of, for example, 5° C. or 8° C. from the boiling temperature of the liquid at ambient pressure, the actuating member 12 is closed. At sea level and when operating with water, the critical temperature measured value is, for example, in the range from 90° C. to 95° C., and is correspondingly lower at installations constructed at altitude. Although this limit value control can lead to restrictions in operation, it does prevent serious cavitation damage which would occur at injection nozzles at the atomization device 11 which have not been specially prepared if the liquid were to spontaneously boil on leaving the nozzle. The temperature control described is of interest for gas turbosets which are installed at locations where there is fundamentally no need for what is known as the anti-icing system, with which a person skilled in the art will be familiar, but at which the temperature may drop below the temperature at which ice is formed on account of the fogging or high fogging operation. Given a predetermined injected liquid mass flow and a limited liquid temperature, the increase in temperature which can be achieved in this way is of course limited. An absolute increase in the temperature of the air can be realized if the mass flow of the liquid, which is entrained in the form of drops, is a multiple higher than the evaporated liquid mass flow, so that the sensible heat which is additionally introduced exceeds the heat of evaporation. In any case, however, it is possible to considerably widen the ambient temperature range in which a fogging or high fogging installation can be operated. If a drop below the minimum permissible temperature at the compressor entry can no longer be avoided, the atomization device 11 must of course be deactivated. The liquid mass flow to be injected in the atomization device 11 is provided by the water treatment installation 216. The water mass flow to be provided is controlled by the level control in the feedwater tank 204, which ensures that the mass flow which is removed from the water/steam cycle for atomization in the intake section of the gas turboset is replaced by a supply of water from the water treatment installation 216.

In a further operating mode, the atomization device can also be operated as a "true" anti-icing system. However, to achieve this, the mass flow control has to be decoupled from the power control, and the mass flow has to be operated with the measured value from the measuring location 22 as a control variable. An absolute temperature rise is, however, only possible if the amount of heated liquid injected is actually so great that the air is supersaturated at the compressor entry, i.e. drops also enter the compressor. It is in this way possible for installations which do not fundamentally require anti-icing, or require anti-icing only for a few days a year, to ensure operation even without having to specially fit a complex anti-icing device.

Figure 6:
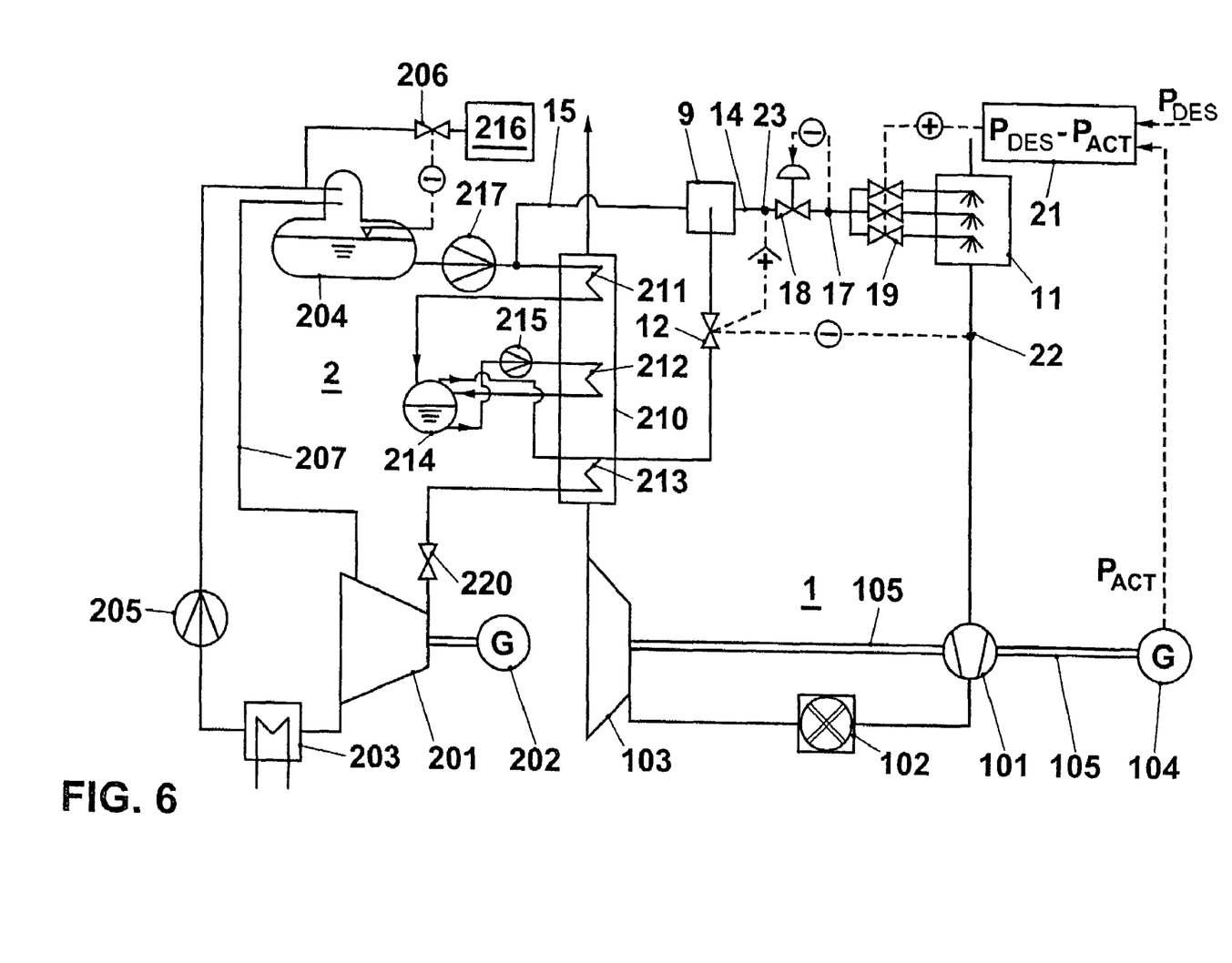

The embodiment shown in FIG. 6 differs from the example illustrated in FIG. 5 inter alia by virtue of the fact that the bypass line 15 and the second line 13 do not open out directly in the feedline 14, but rather open out in a mixing preheater 9, which for its part opens out into the feedline 14. Water which is routed in the bypass line 15 is mixed, in the mixing preheater 9, with a heating medium which has been removed in the heat recovery steam generator 210 and is routed via a branch line and the actuating member 12, and this water is thereby heated. In the example illustrated, the heating medium is removed as superheated steam in the superheater 213. This embodiment also proves particularly suitable if a significant temperature rise is required for the flash atomization, because the heating media mass flow can be made relatively low. Of course, it is also possible for the branch line to be arranged at the steam drum 214 for removing saturated steam or saturated water. Another possible embodiment is distinguished by the fact that boiling water or a boiling water/saturated steam mixture is removed in the evaporator 212. In a further embodiment, heated water is removed from the preheater 211 as heating medium. The choice of removal location is ultimately to be made by a person skilled in the art based on his specialist knowledge and taking account of the thermodynamic boundary conditions. The use illustrated by way of example of high-energy steam as heating medium allows a considerable increase in temperature with a low mass flow of heating medium. By contrast, the use of a lower-quality heating medium requires a greater mass flow of heating medium but on the other hand facilitates accurate temperature control, since a control intervention acting on the heating mass flow of course has less effect on the temperature used as control variable. Furthermore, in the embodiment illustrated, an actuating member 12 is arranged only in the heating medium line. This facilitates control, since only one actuating member has to be acted on; however, the mass flow through the bypass line 15 which is not preheated cannot be separately controlled, and therefore in actual fact cannot be switched off. It will be readily understood that the circuit connection of the branch lines illustrated in FIG. 6 can also be used to control the temperature of the atomization liquid.

Figure 7:
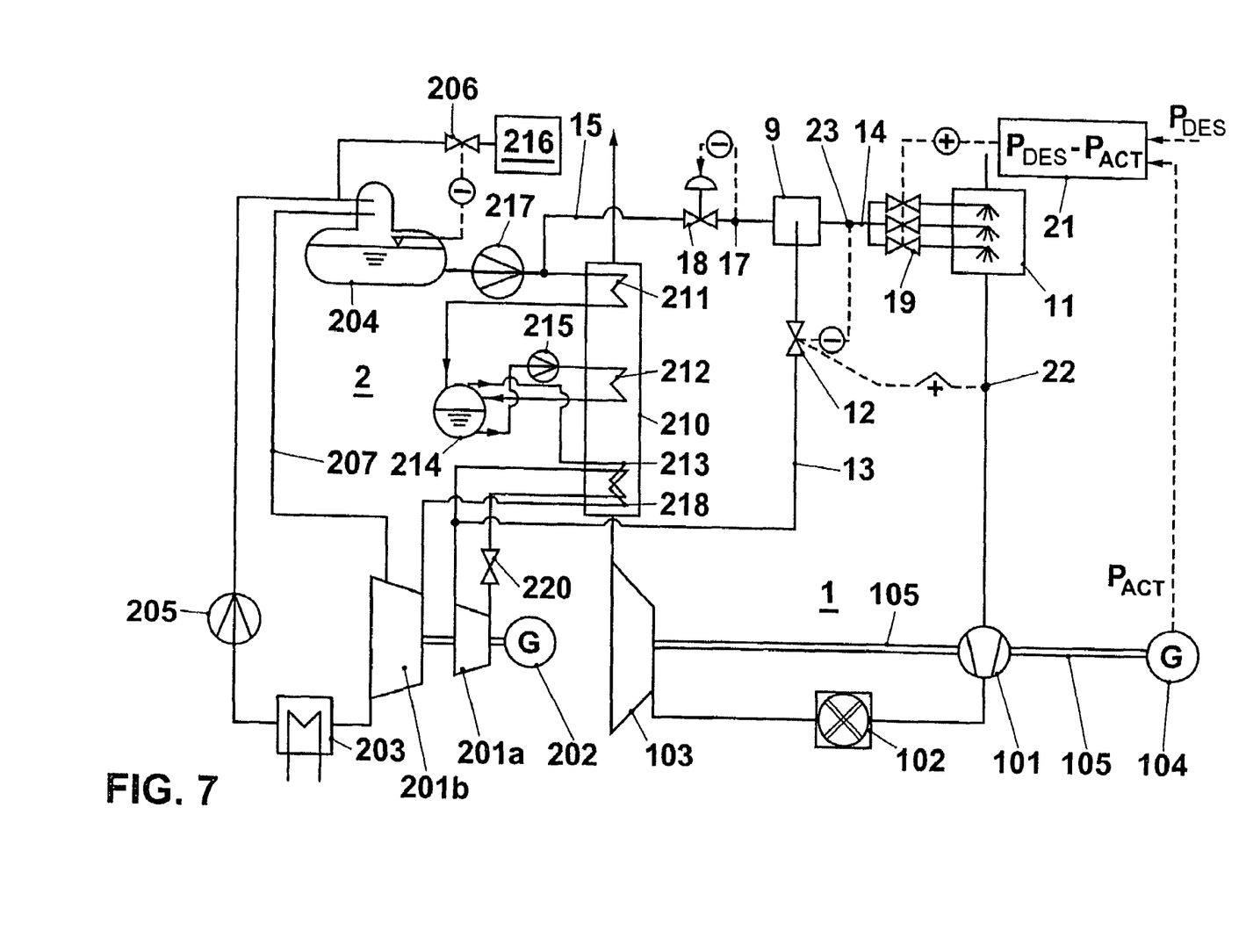

The embodiment shown in FIG. 7 is distinguished firstly by the fact that the temperature of the atomization liquid, measuring location 23, is used as control variable, with a limit control of the temperature in the inflow duct, measuring location 22, being implemented, with a view to limiting the temperature measured there to a maximum value. In the embodiment shown in FIG. 7, the heating medium used is bleed steam from the steam turbine. In this case, the mixing preheater 9 must of course be arranged downstream of the pressure control valve 18, and the pressure must be set to a value which is below the pressure at the bleed location of the water/steam cycle. In many cases, it will not be economic to specially provide a bleed location at the steam turbine. A water/steam cycle with reheating is therefore illustrated. The steam turbine in this case comprises a high-pressure steam turbine 201*a* and an intermediate/low-pressure steam turbine 201*b*. Live steam from the superheater 213 is expanded in the high-pressure turbine 201*a* approximately to the saturated steam state, and is then returned to live steam temperature in a reheater 218 and expanded to condenser pressure in the intermediate/low-pressure turbine 201*b*. In this case, the steam line 13 can particularly easily be connected in the region of the reheater 218. In this case, saturated steam is removed at the exit from the high-pressure turbine 201*a*, as illustrated, or superheated steam is removed at the entry to the intermediate/low-pressure turbine 201b. The branch line 13 may also be connected to the reheater 218, but access to the heat recovery steam generator is more complex in terms of apparatus than connection to inflow and outflow lines located outside the steam generator.

Figure 8:
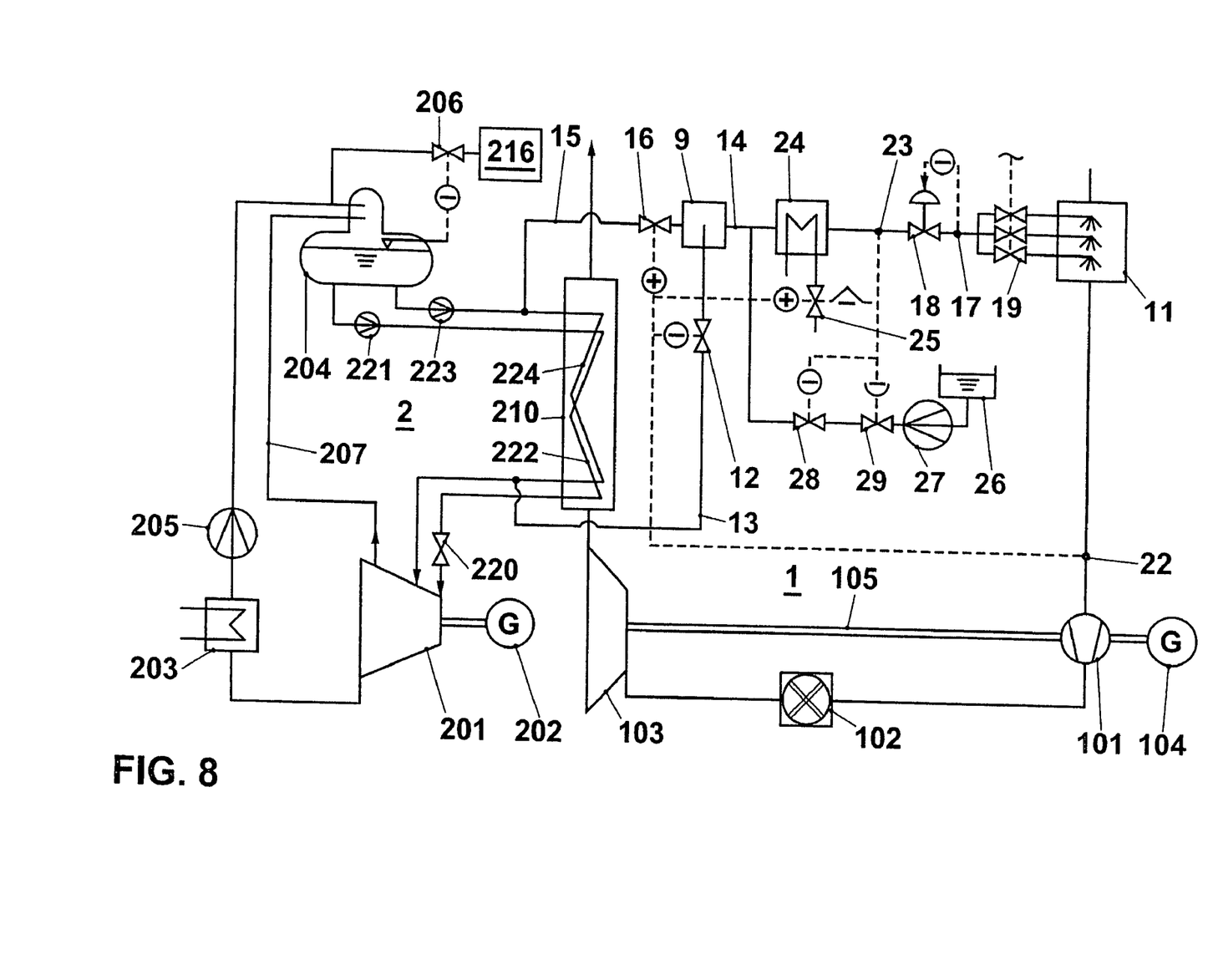

The embodiment illustrated in FIG. 8 has a two-pressure water/steam cycle, with the heat recovery steam generator being designed as a two-pressure single-pass boiler. In this case, a high-pressure branch comprises the high-pressure feed pump 221 and the high-pressure steam generator piping 222 and also an intermediate/low-pressure branch comprising the intermediate/low-pressure feed pump 223 and the intermediate/low-pressure steam generator piping 224 branch off from the feedwater tank 204. The high-pressure steam which is generated is expanded across the entire steam turbine 210, whereas the intermediate/low-pressure branch opens out at an intermediate feed point, located further downstream of the steam turbine, at a location of appropriate pressure. This circuit variant of a water/steam cycle is one with which a person skilled in the art will be inherently familiar, and therefore requires no further explanation. Furthermore, the statements given above in connection with the functioning of the components of the water/steam cycle apply in this case too. If the live steam pressure of the water/steam cycle is well above the required atomizer admission pressure of the atomization device 11, the pressure control valve 18 has to reduce a considerable amount of pressure. This is the case for pressure atomization devices in particular at high live steam pressures, but also when using atomizers assisted by auxiliary media or, for example, rotary atomizers, or if appropriate also when employing flash atomization. Depending on the mass flow of water to be injected and the required pressure reduction, this can have effects, albeit relatively slight but nonetheless perceptible, on the internal energy consumption and therefore on the efficiency of the power plant; by way of example, at a water mass flow of 25 kg/s, a throttling by 50 bar corresponds to a power of around 125 kW which has been heated for no purpose. It is therefore desirable for the branching locations for the feeding to the atomization device 11 to be as far as possible arranged at an appropriate pressure level. This is realized in the exemplary embodiment by the branches being arranged in the intermediate/low-pressure branch. A bypass line 15 branches off from the water/steam cycle downstream of the intermediate/low-pressure feed pump 223 and upstream of the intermediate/low-pressure steam generator piping; this bypass line 15 carries pressurized water which has not been preheated via an actuating member 16 to the mixing preheater 9. A branch line 13 branches off from the intermediate/low-pressure heat exchanger piping downstream of the boiler. The branch could in principle also be arranged within the boiler. In general, however, the variant illustrated is significantly easier to implement, since there is no need to create access into the boiler. It is also eminently possible for a branch line to branch off from the water/steam cycle immediately downstream of the condensate pump 205, if the pressure which is present there is compatible with the required liquid admission pressure of the atomization device; this is the case, for example, when using atomizers which are assisted by auxiliary media, which do not require a high liquid admission pressure. Of course, it would also be possible for a line which branches off at such a location to be routed via a separate heat exchanger arranged in the region of the heat recovery steam generator. The line 13 routes a controllable mass flow of superheated steam as heating medium to the mixing preheater 9 via the actuating member 12. Preheated water flows from the mixing preheater 9 into the feedline 14.

Furthermore, in the embodiment shown in FIG. 8, a cooler 24 is arranged in the liquid line 14. The flow of coolant to the cooler 24, and therefore the cooling capacity of the latter, is controlled by the actuating element 25. By the interaction of the actuating elements 12 and 16, it is possible, as explained above, to control the temperature in the inflow duct upstream of the compressor entry, which is recorded by means of the temperature-measuring location 22, to a desired value or to a desired value range or to a minimum value. It is also possible, within certain limits, to lower the temperature in the inflow duct by cooling the liquid in the cooler 24. For example, it is therefore possible to set the temperature at the measuring location 22 to a value which is as low as possible above the temperature of incipient ice formation in the compressor inlet. Limits are imposed by the fact that the temperature at the measuring location 23 must always remain above the freezing point of the liquid. For pure water, very tight limits are imposed on the addition intake air cooling by precooling of the liquid to be atomized. One measure is the addition of alcohols or other suitable antifreeze additives upstream of the cooler. In the embodiment shown in FIG. 8, there is an additive tank 26, from which a suitable additive can be admixed on demand to the atomization liquid upstream of the cooler 24 via a pump 27, a shut-off valve 29 and an actuating member 28. If the temperature at the measuring location 23 drops below a limit value, the shut-off member 29 is opened. The actuating member 28 is controlled in such a way that the mass flow of additive delivered rises as the temperature drops, in accordance with a predetermined additive concentration/temperature curve. It is in this way possible to achieve maximum permissible cooling of the air at the compressor entry combined, at the same time, with supersaturation of the air with moisture and the resulting internal cooling effect in the compressor. This allows the net power delivery from the gas turboset which is available to drive the generator to be maximized.

Of course, numerous possible combinations will emerge from among the embodiments selected above.

LIST OF DESIGNATIONS

1 Gas turboset
2 Steam turboset
7 Pump
8 Actuating member
9 Mixing preheater
10 Mass flow measuring location
11 Atomization device, mist-formation device
12 Shut-off and/or throttling member, actuating member, heating steam actuating valve
13 Line, branch line, steam line, heating steam line
14 Feedline
15 Branch line, bypass line
16 Shut-off and/or throttling member, actuating member, bypass actuating valve
17 Pressure-measuring location
18 Pressure control valve
19 Mass flow actuating member, control block, shut-off valves
21 Functional block, controller
22 Temperature-measuring location
23 Temperature-measuring location
24 Cooler
25 Actuating member
26 Additive tank
27 Delivery pump 28 Actuating member
29 Shut-off member
30 Temperature-measuring location
31 Circulation pump
32 Cooler
33 Actuating member
34 Circulation pump
35 Cooler
36 Actuating member
37 Temperature-measuring location
40 Exhaust-gas heat exchanger
101 Compressor
102 Combustion chamber
103 Turbine
104 Generator
105 Shaft
106 High-pressure cooling air path
107 Low-pressure cooling air path
108 High-pressure cooling air cooler
109 Low-pressure cooling air cooler
111, 112, . . . 11n Nozzle tubes
191, 192, . . . , 19n Shut-off members
190 Functional block
201 Steam turbine
201a High-pressure steam turbine
201b Intermediate/low-pressure steam turbine
202 Generator
203 Condenser
204 Feedwater tank, feedwater tank/degassing means
205 Condensate pump
206 Actuating element
207 Steam removal
210 Heat recovery steam generator, boiler
211 Preheater
212 Evaporator
213 Superheater, high-pressure superheater
214 Drum
215 Recirculation pump
216 Water treatment installation
217 Boiler feed pump
218 Intermediate/low-pressure superheater
220 Live steam control valve
221 High-pressure feed pump
222 High-pressure heat exchanger piping, high-pressure steam generator piping
223 Intermediate/low-pressure feed pump
224 Intermediate/low-pressure heat exchanger piping, intermediate/low-pressure steam generator piping
$P_{ACT}$ Actual power
$P_{DES}$ Power desired value

The invention claimed is:

1. A method for operating a power plant, comprising an air-breathing combustion engine having an air inlet and an inflow duct arranged upstream of the air inlet, and having an atomization device arranged in the inflow duct, in which method liquid is injected in the atomization device into the inflow duct, comprising the further steps of:
measuring at least one of the following temperatures: temperature of the atomization liquid to be injected upstream of the atomization device and temperature in the inflow duct downstream of the atomization device;
using one of the abovementioned temperatures as control variable; and controlling the temperature of the atomization liquid as a function of the control variable wherein the temperature of the atomization liquid is controlled within a desired value range or to a constant desired value.

2. The method as claimed in claim 1, wherein the temperature of the atomization liquid is controlled to a temperature that is higher than the boiling point at ambient pressure.

3. The method as claimed in claim 1, comprising the steps of:
determining the temperature in the inflow duct downstream of the atomization device;
deactivating the injection of liquid if the temperature in the inflow duct drops below a minimum permissible value;
deactivating the injection of liquid if the temperature in the inflow duct exceeds a maximum permissible value.

4. The method as claimed in claim 1, comprising the steps of:
increasing the temperature of the atomization liquid if the temperature in the inflow duct drops below a desired value or a lower threshold value;
reducing the temperature of the atomization liquid if the temperature in the inflow duct exceeds a desired value or upper threshold value.

5. The method as claimed in claim 4, comprising the step of:
limiting the temperature of the atomization liquid to a maximum value.

6. The method as claimed in claim 5, comprising the step of:
deactivating the injection of liquid when the temperature in the inflow duct reaches or drops below a permissible minimum temperature and at the same time the maximum permissible temperature of the atomization liquid is reached.

7. The method as claimed in claim 1, comprising the step of:
increasing the temperature of the atomization liquid if the temperature in the inflow duct drops below a lower limit temperature.

8. The method as claimed in claim 1, comprising the step of:
lowering the temperature of the atomization liquid when an upper temperature in the intake duct is reached or exceeded.

9. The method as claimed in claim 1, comprising the step of limiting the drop in the temperature of the atomization liquid to a minimum value.

10. The method as claimed in claim 9, comprising the step of:
deactivating the injection of liquid when a permissible maximum temperature in the inflow duct is exceeded and at the same time the minimum permissible temperature of the atomization liquid is reached.

11. The method as claimed in claim 1, comprising the step of:
admixing an additive, in particular an antifreeze, to the atomization liquid if the temperature of the atomization liquid drops below a lower threshold temperature for the atomization liquid.

12. A method for operating a power plant, comprising an air-breathing combustion engine having an air inlet and an inflow duct arranged upstream of the air inlet, and having an atomization device arranged in the inflow duct, in which method liquid is injected in the atomization device into the inflow duct, comprising the further steps of:
measuring at least one of the following temperatures: temperature of the atomization liquid to be injected upstream of the atomization device and temperature in the inflow duct downstream of the atomization device;

using one of the abovementioned temperatures as control variable: controlling the temperature of the atomization liquid as a function of the control variable: and
passing at least a first part mass stream of the atomization liquid through a heat supply device.

13. The method as claimed in claim 12, comprising the step of:
controlling the supply of heat in the heat supply device in order to control the temperature of the atomization liquid.

14. The method as claimed in 12, comprising the steps of:
routing a second part-stream of the atomization liquid through a bypass line;
combining the first part-stream and the second part-stream prior to the atomization; and
variably controlling at least one of the part-streams in order to control the temperature of the atomization liquid.

15. The method as claimed in claim 14, wherein the temperature of the atomization liquid is measured downstream of the location at which the part-streams are combined.

16. The method as claimed in claim 14, comprising the steps of:
evaporating the first part-stream in the heat supply means; and
combining the first part-stream and the second part-stream in a mixing preheater.

17. The method as claimed in claim 14, comprising the steps of:
passing a liquid mass flow through an exhaust gas heat exchanger of the engine;
passing the first part mass stream at least through part of the flow path of the exhaust-gas heat exchanger; and
branching off the second part-stream upstream of the exhaust-gas heat exchanger.

18. The method as claimed in claim 12, comprising the step of:
delivering at least the first part-stream, prior to its introduction into the heat supply device, at a pressure which corresponds at least to the liquid admission pressure of the atomization device.

19. A method for operating a power plant, comprising an air-breathing combustion engine having an air inlet and an inflow duct arranged upstream of the air inlet, and having an atomization device arranged in the inflow duct, in which method liquid is injected in the atomization device into the inflow duct, comprising the further steps of:
measuring at least one of the following temperatures: temperature of the atomization liquid to be injected upstream of the atomization device and temperature in the inflow duct downstream of the atomization device:
using one of the abovementioned temperatures as control variable:
controlling the temperature of the atomization liquid as a function of the control variable:, comprising the steps of:
passing at least part of the atomization liquid through a cooler prior to the atomization; and
controlling the cooling capacity of the cooler in order to control the temperature of the atomization liquid.

20. A method for operating a power plant, comprising an air-breathing combustion engine having an air inlet and an inflow duct arranged upstream of the air inlet, and having an atomization device arranged in the inflow duct, in which method liquid is injected in the atomization device into the inflow duct, comprising the further steps of:
measuring at least one of the following temperatures: temperature of the atomization liquid to be injected upstream of the atomization device and temperature in the inflow duct downstream of the atomization device:
using one of the abovementioned temperatures as control variable: and
controlling the temperature of the atomization liquid as a function of the control variable, wherein the atomization of the liquid takes place as pressure atomization, 21. The method as claimed in claim 20, wherein the atomization pressure of the atomization liquid preferably exceeding 20 bar.

22. A power plant comprising:
an air-breathing combustion engine having an air inlet and an inflow duct arranged unstream of the air inlet, and having an atomization device arranged in the inflow duct, for receiving injected liquid:
a sensor for measuring at least one of the following temperatures: temperature of the atomization liquid to be injected upstream of the atomization device and temperature in the inflow duct downstream of the atomization device, one of the abovementioned temperatures being designated as a control variable: and
a controller for controlling the temperature of the atomization liquid as a function of the control variable, in which the combustion engine is a gas turboset, and in which the air inlet is the compressor inlet of the gas turboset.

23. A power plant as claimed in claim 22, comprising:
a cooler arranged in the flow path of the atomization liquid upstream of the atomization device.

24. A device for operating a power plant that includes an air- breathing combustion engine having an air inlet and an inflow duct arranged upstream of the air inlet, and having an atomization device arranged in the inflow duct, for receiving injected liquid, the device comprising:
a sensor for measuring at least one of the following temperatures: temperature of the atomization liquid to be injected upstream of the injection device and temperature in the inflow duct downstream of the atomization device, one of the abovementioned temperatures being designated as a control variable;
a controller for controlling the temperature of the atomization liquid as a function of the variable wherein the temperature of the atomization liquid is controlled within a desired value range or to a constant desired value; and
a heat supply device for passing at least a first part mass stream of the atomization liquid.

25. A device for carrying out the method as claimed in claim 24, wherein the heat supply device is a heat generator with a heat exchanger.

26. The device as claimed in claim 25, wherein the atomization device comprises pressure atomizer nozzles.

27. A device as claimed claim 25, in combination with a power plant, comprising an air-breathing combustion engine having an air inlet and an inflow duct arranged upstream of the air inlet, the atomization device being arranged in the inflow duct.

28. A device for carrying out the method as claimed in claim 24, wherein the heat supply device is thermally coupled to a cooling circuit of a heat engine.

29. A device as claimed in claim 24, wherein the heat supply device is a cooling-air cooler of a gas turboset.

30. A device for carrying out the method as claimed in claim 24 comprising;
a first flow path, which leads through the heat supply device, a second flow path, which includes a bypass line that bypasses the heat supply device, and an atomization liquid feedline, both flow paths opening out in the feedline, and an adjustable throttling member being arranged in at least one of the flow paths for controlling the temperature of the atomization liquid.

31. An apparatus for carrying out the method as claimed in claim wherein the heat supply device is a heat recovery steam generator of a water/steam cycle, and comprising:
a bypass line for routing a second part-stream of the atomization liquid, the device being configured for combining the first part-stream and the second part-stream prior to the atomization, and for variably controlling at least one of the streams in order to control the temperature of the atomization liquid.

* * * * *